US008199751B2

(12) United States Patent
Scandurra et al.

(10) Patent No.: US 8,199,751 B2
(45) Date of Patent: Jun. 12, 2012

(54) METHOD OF EXCHANGING INFORMATION IN A COMMUNICATION NETWORK, CORRESPONDING COMMUNICATION NETWORK AND COMPUTER PROGRAM PRODUCT

(75) Inventors: Alberto Scandurra, Messina (IT); Giuseppe Falconeri, Sant' Agata Li Battiati (IT); Daniele Mangano, Messina (IT)

(73) Assignee: STMicroelectronics s.r.l., Agrate Brianza (IT)

( * ) Notice: Subject to any disclaimer, the term of this patent is extended or adjusted under 35 U.S.C. 154(b) by 245 days.

(21) Appl. No.: 12/567,114

(22) Filed: Sep. 25, 2009

(65) Prior Publication Data
US 2010/0080229 A1    Apr. 1, 2010

(30) Foreign Application Priority Data
Oct. 1, 2008    (IT) .............................. TO2008A0718

(51) Int. Cl.
*H04L 12/28*    (2006.01)
(52) U.S. Cl. ....................................... 370/389; 370/392
(58) Field of Classification Search .................. None
See application file for complete search history.

(56) References Cited

U.S. PATENT DOCUMENTS 7,574,233 B2 *   8/2009   Welsh ..................... 455/556.1
2007/0121615 A1 *   5/2007   Weill et al. ................. 370/389

OTHER PUBLICATIONS

European Search Report, EP Patent Application No. 09169415.8; Jan. 12, 2010, 5 pages.
Italian Search Report, IT Patent Application No. TO20080718; Jun. 17, 2009, 6 pages.
Wolf, "Network on Chips: A New Paradigm for Component-Based MPSoC Design," 2005, Elsevier B.V, pp. 50-79 and 173-175.
W. R. Stevens, "UDP: User Datagram Protocol"; TCP/IP Illustrated, vol. 1—The Protocols; Addison-Wesley, Reading, PA, 1994; pp. 143-145.
Z. Lu, "Layered Switching for Networks on Chip"; Design Automation Conference, 2007; Jun. 4, 2007; pp. 122-127.

* cited by examiner

*Primary Examiner* — Robert Wilson
(74) *Attorney, Agent, or Firm* — Hogan Lovells US LLP

(57) ABSTRACT

A method of performing transactions in a communication network in which is exchanged between Intellectual Property (IP) cores has information transported in packets which include a header for transporting control information and one or more payloads transporting content. A versatile packet format is used which is adapted to transport different traffic patterns generated by the IP cores using different protocols for simple interoperability between the IP cores and also providing configurability of the granularity arbitration process to correct crossing the routers in the communication network.

30 Claims, 5 Drawing Sheets

| Header field | | STBus | AMBA (AXI/AHB) |
|---|---|---|---|
| HF1 | <1:0> | ip_prot (00) | ip_prot (01) |
| HF2 | <2> | security | security |
| HF3 | <10:3> | src<7:0> | awid/arid<7:0> |
| HF4 | <12:11> | src<9:8> | user def. id<9:8> |
| HF5 | <14:13> | qos<1:0> | qos<1:0> |
| HF6 | <15> | wrp | undef. op. |
| HF7 | <35:16> | add<31:12> | add<31:12> |
| HF8 | <47:36> | add<11:0> | add<11:0> |
| HF9 | <49:48> | Ptype<1:0> | Ptype<1:0> |
| HF10 | <50> | mw | mw |
| HF11 | <51> | res_opt | res_opt |
| HF12 | <54:52> | opsize<2:0> | cellsize<2:0> |
| HF13 | <58:55> | reserved<3:0> | reserved<3:0> |
| HF14 | <62:59> | tid<3:0> | len<3:0> |
| HF15 | <64:63> | adv<1:0> | reserved |
| HF16 | <68:65> | cache<3:0> | cache<3:0> |
| HF17 | <71:69> | prot<2:0> | prot<2:0> |

*Fig. 9*

METHOD OF EXCHANGING INFORMATION IN A COMMUNICATION NETWORK, CORRESPONDING COMMUNICATION NETWORK AND COMPUTER PROGRAM PRODUCT

RELATED APPLICATION

The present application claims priority of Italian Patent Application No. TO2008A000718 filed Oct. 1, 2008 with the Italian Patent Office, which is incorporated herein in its entirety by this reference.

BACKGROUND OF THE INVENTION

1. Field of the Invention

The invention relates to communication techniques with particular applicability to use in the System-on-Chip (SoC) interconnect domain.

2. Description of the Related Art

In order to connect a large amount of Intellectual Property (IP) cores together, Network on Chips (NoC) are increasingly used. The main building blocks of a Network on Chip are the Network Interface (NI), the router or nodes, and the link. The NI(s) provide the access point for the IP cores, routers provide the actual data transport mechanism, and links are used to set up point-to-point interconnections.

With reference to FIG. 1, network architectures can be divided typically into 5 network layers. Layer L1 defines the physical layer such as the link wires L. Layer L2 represents the data link layer, which defines the format of data on the network. Specifically, the data link layer handles the physical and logical connections to the destination of the packet. Layer L3 represents the network layer, which is responsible e.g. for routing. Layer L4 represents the transport layer, which subdivides user-data into network-packets. Finally, layer L5 represents the application layer.

Usual Network on Chip packet formats follow an approach such that interoperability between different IP protocols is not easy to manage and arbitration granularity is usually fixed and common to all the IP cores.

The missing IP protocols interoperability implies the need for using protocol converters when different IP cores need to communicate to each other and coexist in the same system, which results in an overhead in terms of area and latency, paid e.g. in terms of clock cycles required to perform the conversion.

The unique arbitration granularity forces to treat all traffic types generated by the different IP cores in the same way, preventing the possibility of applying different arbitration strategies to different traffic classes, what would allow to guarantee a better quality of service (QoS).

Additionally, there is no error management and transport policy, which support any particular IP protocol, and consequently error conditions cannot be managed in an optimized way.

SUMMARY OF THE INVENTION

The arrangements considered in the foregoing suffer from the inability to handle communications between different IP protocols in an efficient way. The need is therefore felt for new arrangements, which provide a versatile packet format allowing the support of different IP protocols within the same SoC, making their interoperability easier in terms of information exchange.

The object of the present invention is to provide an effective response to those needs. According to the present invention, that object is achieved by means of a method having the features set forth in the claims that follow. The invention also relates to a corresponding system as well as a corresponding computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

Referring to such previously described layered network architecture representation, used to specify and implement a NoC, an embodiment applies to the transport layer, which is implemented typically by the network interfaces NI, and to the network layer, which is typically implemented by the NoC nodes or router, responsible for the transmission of the end-to-end information and for the propagation of the information across the network, respectively.

Further improved embodiments also support information, which determines the granularity of the arbitration process when the versatile pack of crosses routers within a NoC. In another aspect of the embodiment, there is a possibility of carrying error information.

The above objectives are achieved by embodiments, which exploit besides the usual NoC interface signals responsible for the transmission of flits relying on a classical valid/ack handshake, also additional features.

Specifically, the versatile packet format applies to the transport layer, while the configurable arbitration granularity applies to the network layer. The techniques are used to carry error information apply to both transport and network layers.

Specifically, an embodiment provides a configurable packet format having a configurable header, which allows to transport within the same network any type of traffic generated by any IP core following a specific protocol.

In an embodiment, a parametric header structure is used. In such a header structure, a header field identifies the protocol of the IP, which generates the traffic. According to the value of a field, such as the first header field, the following fields can differ in both meaning and size, depending on the IP native protocol. Preferably this header field has a variable size in terms of number of bits according to the number or protocols to be supported.

An embodiment supports variable arbitration granularity, which allows to treat traffic patterns generated by different IP cores in different ways inside the network.

Specifically, in an embodiment, NoC interface signals are provided, which carry information about boundaries between possible elements characterizing possible different hierarchy levels of the IP native protocol (i.e. packet, chunk and message in STBus context, packet and burst in AMBA context).

In an embodiment, a flit identifier is provided, carrying information about the start and the end of a NoC transaction, determining the arbitration granularity.

An improved embodiment provides the possibility to handle errors carrying the proper information across the network, according to the IP protocol used by the Intellectual Property (IP) cores interconnected with each other.

Specifically, an embodiment of the error information management and transport is based on the header of the response traffic and optimized for STBus error support.

Another embodiment of the error information management and transport is based on an additional 2-bit wide bus and more suitable for AMBA error support. Those skilled in the art will appreciate that both error management and transport methods might be used contemporarily in the same network in order to support both protocols in an efficient manner.

In an embodiment, an optional signal is provided in the response path carrying information about transaction status, which might report possible errors and which are the flits affected.

The various embodiments manifest
  simultaneous communication between different IP cores implementing different network protocols, such as STBus, AMBA/AXI (Advanced Microcontroller Bus Architecture/Advanced eXtensible Interface), AMBA/AHB (Advanced Microcontroller Bus Architecture/Advanced High-performance Bus),
  implicit specification of arbitration granularity, depending on the IP protocol and traffic pattern, such as, in case of STBus IP, the arbitration granularity can be chosen equal to the STBus packet, chunk or message, and
  error information management and transport.

The various embodiments disclosed herein provide several advantages, such as:
  different IP protocols can be supported within the same network framework thanks to a parametric approach applied to the header structure,
  arbitration granularity is preliminarily chosen at initiator IP level according to its performance demand and interaction with the other IP cores in order to meet the global QoS of the network, and
  STBus systems or AMBA systems can implement an optimized error management methodology in order to meet both functionality and optimized performance.

BRIEF DESCRIPTION OF THE DRAWINGS

The invention will now be described, by way of example only, with reference to the enclosed figures of drawing, wherein:

FIG. 9 shows an exemplary configuration header structure.

DETAILED DESCRIPTION OF PREFERRED EMBODIMENTS

FIG. 9 shows an exemplary embodiment of a parametric header structure, whose fields depend on a header field HF1 representing the used IP protocol, denominated "ip_prot". By way of example, only the STBus and the AMBA (AXI/AHB) protocol are shown for demonstration.

Specifically, a header field HF1 having a binary value "00" indicates the use of the STBus protocol and a binary value "01" indicates the use of the AMBA protocol.

Figure 8:
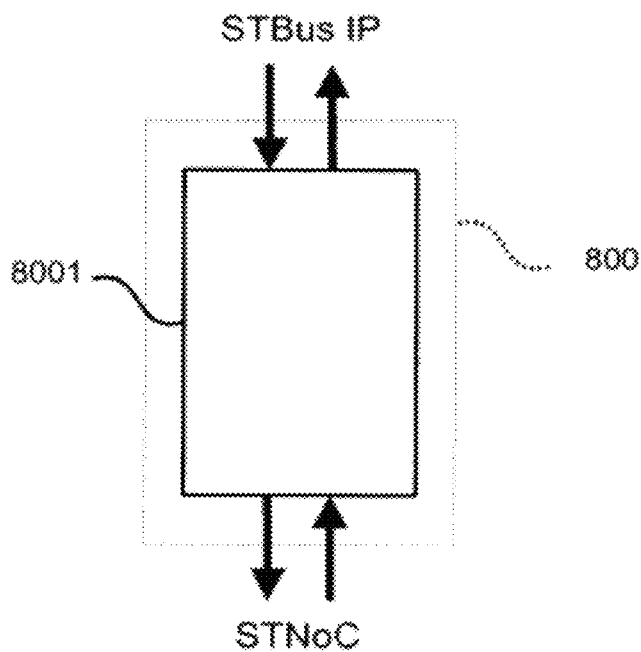
FIG. 8 is a block diagram representation of an modified STNoC network interface architecture.

FIG. 8 highlights that several of the header fields might be used for both protocols with similar information content, such as:
  a header field HF2 defining a security level, denominated "security",
  a header field HF5 carrying quality of service information, denominated "qos",
  header fields HF7 and HF8 carrying a 32 bit address, denominated "add",
  a header field HF9 providing information on the addressing policy, denominated "PType",
  a header field HF10 defining a load or store operation, denominated "rnw",
  a header field HF11 providing information on response optimization, denominated "res_opt",
  a header field HF16 providing information on cache ability, denominated "cache", and
  a header field HF17 providing information on protection, denominated "prot".

However, the header has to provide also information which is not common to the supported protocols. Specifically, the header might support for the STBus protocol also:
  header fields HF3 and HF4 providing the source identified, denominated "src",
  a header field HF6 providing information on write posting, denominated "wrp",
  a header field HF12 carrying the STBus packet size, denominated "opsize",
  a header field HF14 providing the transaction identifier denominated "tid", and
  a header field HF15 providing information of the CPU operation type, denominated "adv".

Instead, the same header fields might be used in the AMBA protocol for different objectives, such as:
  header fields HF3 and HF4 might provide also the source identified, wherein the field HF3 might provide the 8 bit source identifier of the AMBA protocol, denominated "awid/arid", and the field HF4 might provide additional user defined source information, denominated "user def. id",
  the header field HF6 might provide information on AHB undefined operations, denominated "undef. op.",
  the header field HF12 might carry the AMBA cell size, denominated "cellsize", and
  the header field HF14 might provide the packet length, denominated "len".

As can be seen, for example the field HF15 remains unused for the AMBA protocol, which is denoted in FIG. 9 as "reserved".

Similarly, by way of example a header structure of 72 bits is assumed, however the exemplary header structure carries at most only 68 bit of information. Consequently, the remaining bit might be assigned to an unused header field HF13 again denoted "reserved".

Those skilled in the art will appreciate that both the STBus and the AMBA (AXI/AHB) protocols are of common knowledge, rendering a more detailed description of the header fields herein unnecessary.

Figure 1:
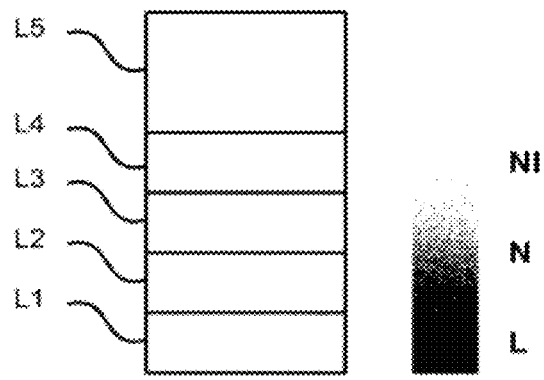
FIG. 1 shows a layered representation of a Network on Chip architecture described already in the foregoing.
Figure 2:
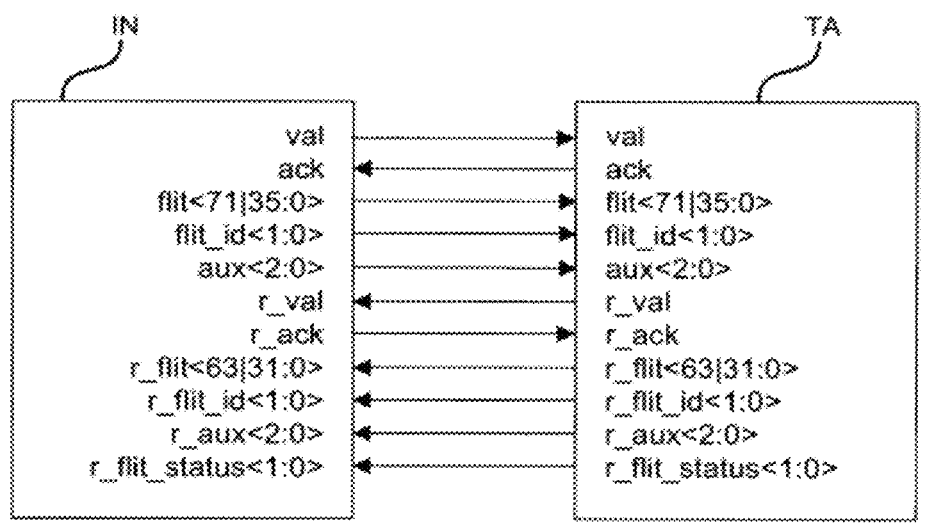
FIG. 2 shows network interface signals between an initiator and a target.

FIG. 2 shows possible embodiments of network interfaces of both an initiator IN and a target TA, which support the header described in the foregoing.

Specifically, the network interfaces might support for communication from the initiator IN to the target TA the classical handshake signals "val" and "ack" and the above header structure might be communicated from the initiator IN to the target TA via the signals "flit" having e.g. 72 bit.

In an improved embodiment, the network interfaces support also signals, denoted "aux", carrying information about boundaries between possible elements characterizing possible different hierarchy levels of the IP native protocol.

In the improved embodiment, the network interface support also a flit identifier, denoted "flit_id", carrying information about the start and the end of a NoC transaction, which determines the arbitration granularity.

Similarly, the network interfaces might support for communication from the target TA to the initiator IN handshake signals "r_val" and "r_ack", a signal "r_aux" carrying information about boundaries between possible elements, and a signal "r_flit_id" carrying information about the start and the end of a NoC transaction.

Instead of communication the complete header structure from the target to the initiator, in an improved embodiment, only a reduced header structure is communicated via the signals "r_flit" having e.g. only 64 bits. The fact that the response flit may be smaller than the request flit comes from the fact that, while in request, together with the data of N bytes (or N*8 bits) it is necessary to provide also a "mask" (byte_enables) of N bits to specify, in the writing case, which byte of the total N byte should actually be written, in the read case this information is not relevant since, after receiving N bytes, the initiator will read only the ones in which it is really interested, so the response "channel" may have N bit less.

In an improved embodiment, an optional signal, denoted "r_flit_status", in the response path is supported, which carries information about the transaction status, such as possible errors and which flits are affected.

Figure 3:
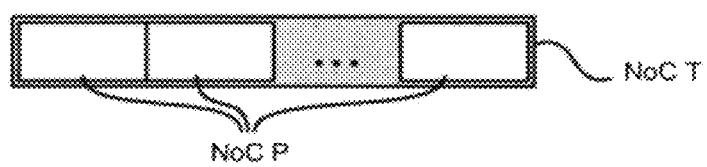
FIG. 3 shown a definition of packed based NoC traffic.

FIG. 3 shows a typical example of a transaction between the initiator IN and the target TA, wherein each NoC transaction T is composed of several packets P.

In the embodiment shown in FIG. 2, the start and the end of the transaction could be indicated by the signal "flid_id" or "r_flit_id", while the boundaries of each packet could be marked by the signals "aux" or "r_aux".

A NoC packet P, in turn, consists of flow control units, called also flits, which are the elements transmitted on the data link layer e.g. within a clock cycle in case of synchronous transmission, or as asynchronous entities.

The variable arbitration granularity consists actually in defining the relationship between the NoC transaction, being the entity transferred after arbitration, and the NoC packets, building the transaction itself and representing the basic IP traffic elements, usually called packets as well.

Figure 4:
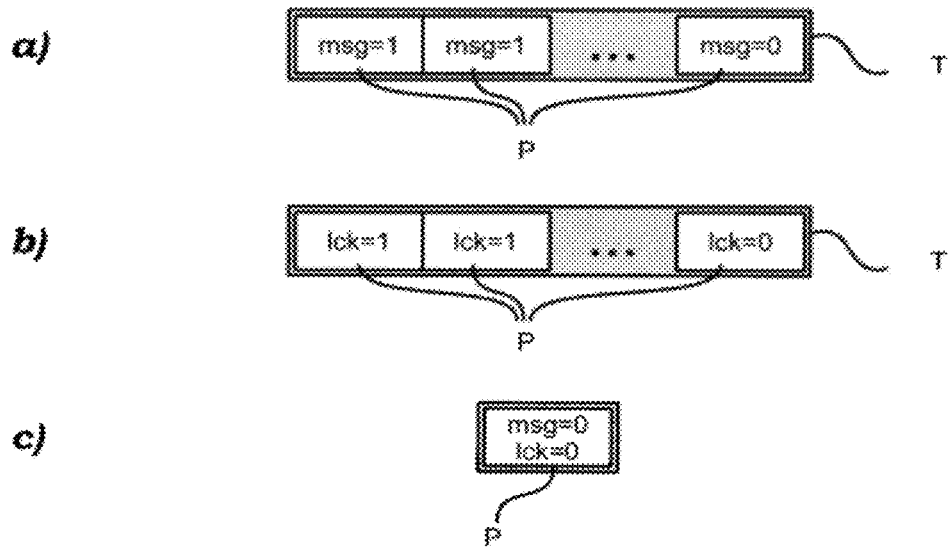
FIGS. 4a to 4c show different arbitration granularities at the example of STBus-like traffic.

FIGS. 4a to 4c show in the example of the STBus protocol different types of arbitration granularities. Each NoC packet P might be coincident with a STBus packet, wherein the values of the signals STBus msg and lck determine the STBus traffic pattern, such as message, chunk, or simple packet, and the chosen arbitration granularity determines the length of the NoC transaction T.

Specifically, FIG. 4a shows a NoC transaction T, which is coincident with a series of STBus messages.

Similarly, FIG. 4b shows a NoC transaction T, which is coincident with a series of STBus chunks.

Finally, FIG. 4c shows a NoC transaction T, which is coincident with a single STBus packet.

Figure 5:
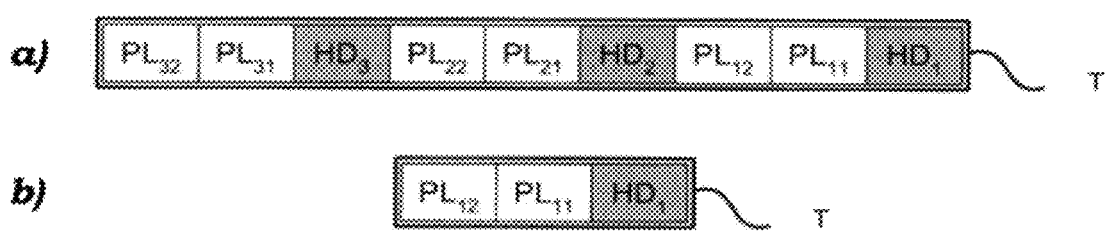
FIGS. 5a and 5b show arbitration granularities matching STBus chunks and STBus packets, respectively.

FIGS. 5a and 5b show in much more detail two possible STNoC transactions with different granularities.

Specifically, FIG. 5a shows a transaction T of a STBus chunk being composed of three packets. Each STNoC packet is composed of a header $HD_1$, $HD_2$ and $HD_3$, respectively, carrying e.g. the header fields indicated in the foregoing. Typically, in case of a store request, indicates a transmission of data from the initiator to the target, or a load response, indicates a transmission of data from the target to the initiator. The packet might also contain several payload, denoted as $PL_{11}$ and $PL_{12}$, $PL_{21}$ and $PL_{22}$, $PL_{31}$ and $PL_{32}$, respectively.

Similarly, FIG. 5b shows a transaction T with a granularity of a simple STBus packet, having e.g. only one header flit $HD_1$ and two payload flits $PL_{11}$ and $PL_{12}$.

In order to forward the packets of a transaction e.g. from several initiators to the same target in a NoC, several arbitration strategies might be used.

Figure 6:
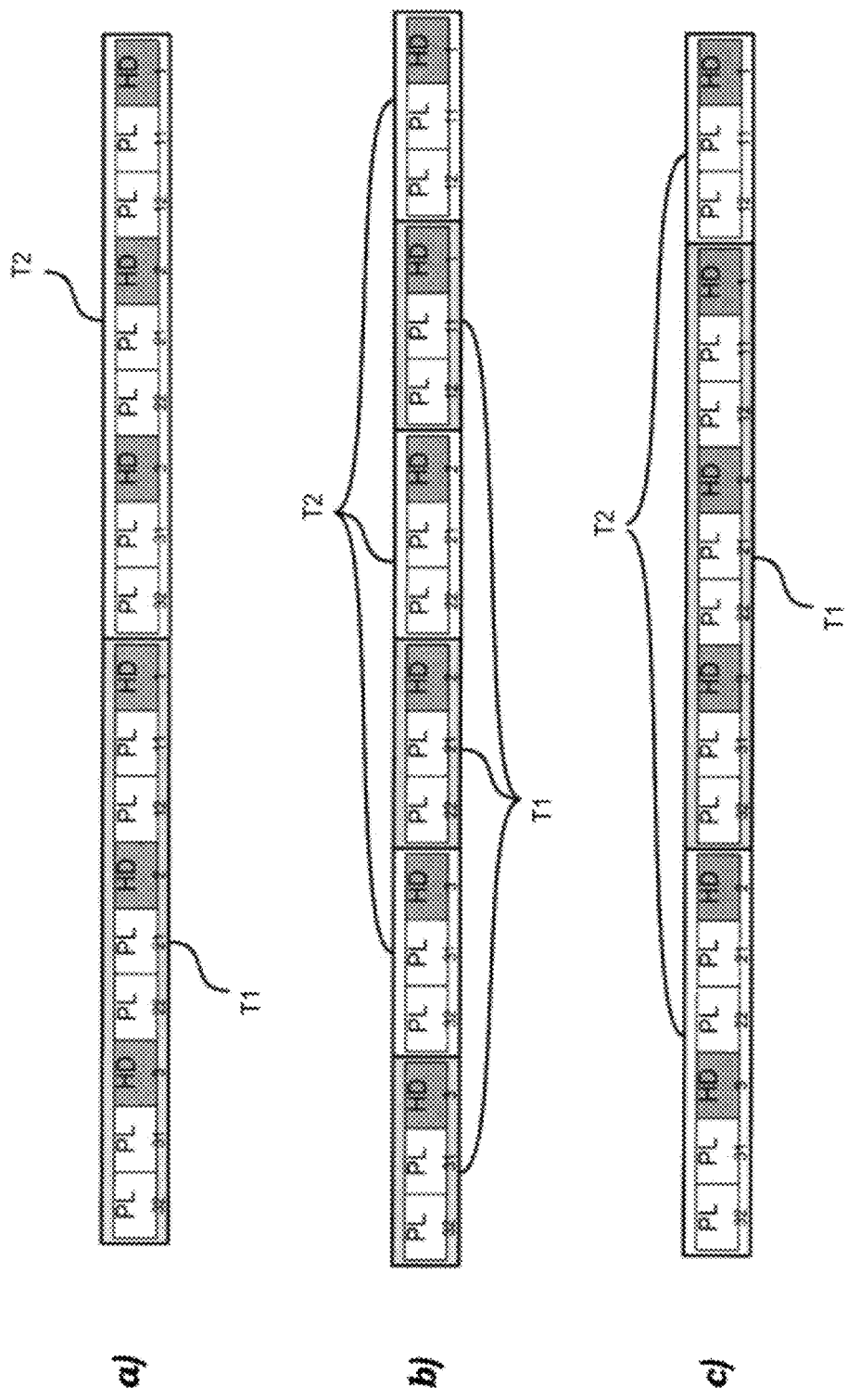
FIGS. 6a to 6c show exemplary round robin arbitrations between two STBus initiators generating messages.

FIGS. 6a to 6c show examples of round-robin arbitrations between two STBus initiators generating respective transactions T1 and T2.

In the scenario shown in FIG. 6a, arbitration granularity is chosen equal to the STBus message size for both initiators, and consequently the two messages are transmitted back to back with no interleaving.

In the scenario shown in FIG. 6b, arbitration granularity is chosen equal to the STBus packet size for both initiators, and consequently the packets are mixed and transmitted alternatively.

FIG. 6c shows the result of a round-robin arbitration between two STBus initiators with different granularity. Specifically, the granularity of the transaction T1 of the first initiator is chosen equal to the STBus message size, while the granularity of the second transaction T2 is chosen equal to the STBus packet size.

This allows to mix traffic having different requirements. For example, the traffic T1 from the first initiator might have a low latency, and the complete message should be transmitted as soon as possible. Conversely, the traffic T2 from the second initiator might be a high bandwidth traffic, which needs to transfer a big amount of information in a well defined time window but with no strong constraints on latency.

Figure 7:
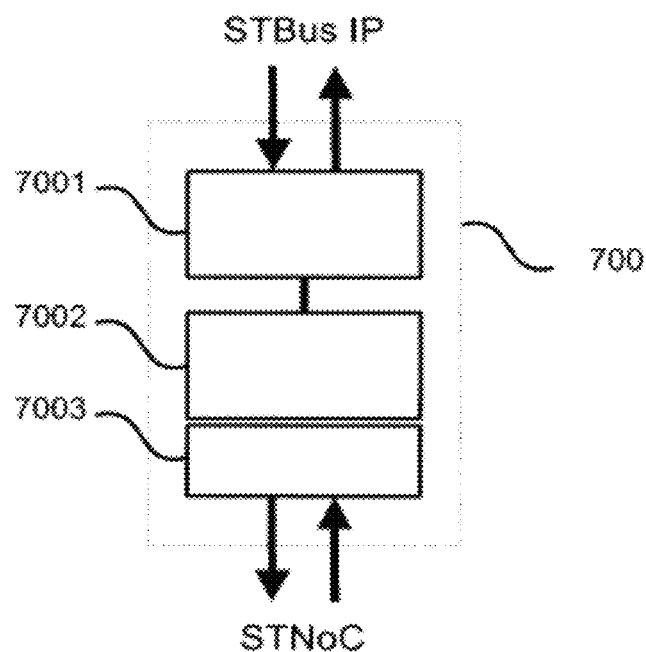
FIG. 7 is a block diagram representation of an prior art STNoC network interface architecture.

FIG. 7 shows a more detailed view of a prior art network interface 700, interfacing e.g. a STBus IP with the NoC such as the STNoC.

Specifically, such architecture is characterized by an abrupt distinction between transport and network layer, in such a way that the network interface 700 comprises internally two sub-modules which perform the conversion.

A first sub-module 7001, called also shell, is responsible for the transformation between the IP protocol, such as STBus, and the network transport layer protocol, such as STNoC. Specifically, the module 7001 performs mainly mapping and translation operations.

A second module 7002, called also kernel, is responsible for the management of the network layer information, such as generation of the destination identifier in the request path, generation of the source identifier in the response path, and quality of service information.

Finally, a module 7003 is responsible for the transmission and manages traffic to and from the network via a handshake protocol.

From a hardware point of view, the sub-modules 7001 and 7002 introduce one cycle of latency and require separate FIFO (First In First Out) memories, leading to a non optimized latency and area occupancy.

From an architectural point of view, such an approach determines the transaction header to be composed of two flits at least. The first header flit is used to transmit the network layer information, and the second header flit is used to transmit the transport layer information. Due to the two level structure of the conversion it is impossible to merge both header sets in one flit.

Instead the arrangement described in the foregoing provide a unique parametric header, which can be transported e.g. by a single flit.

FIG. 8 shows in that respect a modified network interface 800, having only a single conversion block 8001. Specifically, the separation of the network interface 800 in shell and kernel is no longer required, allowing to share the same FIFO memory between logics doing different tasks. This allows to reduce the transmission latency and optimizing the area occupancy.

Those skilled in the art will appreciate that the example of flits with 72 bit, such as used in STNoC, are used only for demonstration, even though 72 bit are the most widely used in current applications.

Without prejudice to the underlying principles of the invention, the details and the embodiments may vary, even appreciably, with reference to what has been described by way of example only, without departing from the scope of the invention as defined by the annexed claims.

The invention claimed is:

1. A method of exchanging information transported in packets including a header and one or more payloads in a communication network comprising routers, wherein information is exchanged via the routers between a plurality of Intellectual Property (IP) cores using different protocols, said method comprising:
   transporting in a versatile packet format different traffic patterns generated by said IP cores using different protocols to ensure interoperability between said IP cores;
   managing crossing of the different traffic patterns by said routers in the communication network of said different traffic patterns using at each router a variable granularity arbitration process enabling different traffic patterns generated by different IP cores to be treated differently by the routers; and
   organizing said communication network according to a layered architecture comprising a plurality of network layers including a transport layer and a network layer, wherein
   said versatile packet format is used in said transport layer, and wherein
   said variable granularity arbitration process is used in said network layer.

2. The method of claim 1, further comprising:
   providing a parametric structure of the header of the packet, said structure comprising a first header field representing the protocol used by the core generating the traffic and a set of subsequent header fields configured to convey different contents and take different sizes depending on the value of the first header field.

3. The method of claim 1, further comprising:
   providing a parametric structure of the header of the packet; and
   entering in said structure information on the boundaries of the packets.

4. The method of claim 1, further comprising:
   providing a parametric structure of the header of the packet; and
   entering in said structure information to determine the arbitration granularity as a function of the start and the end of a transaction.

5. The method of claim 1, further comprising:
   organizing said packets in a plurality of flow control units called flits.

6. The method of claim 1, further comprising:
   reporting in the network the transaction status in order to indicate the presence of errors and the flow control units affected by said errors.

7. The method of claim 1, further comprising:
   using as said variable granularity arbitration process a round-robin arbitration process.

8. The method of claim 1, comprising transforming between said different protocols used by said plurality of IP cores based on mapping and translation operations.

9. A method of exchanging information transported in packets including a header and one or more payloads in a communication network comprising routers, wherein information is exchanged via the routers between a plurality of Intellectual Property (IP) cores using different protocols, said method comprising:
   transporting in a versatile packet format different traffic patterns generated by said IP cores using different protocols to ensure interoperability between said IP cores;
   managing crossing of the different traffic patterns by said routers in the communication network of said different traffic patterns using at each router a variable granularity arbitration process enabling different traffic patterns generated by different IP cores to be treated differently by the routers, wherein
   a header of the packet has a parametric structure, said structure comprising a first header field representing the protocol used by the core generating the traffic and a set of subsequent header fields configured to convey different contents and take different sizes depending on the value of the first header field.

10. The method of claim 9, further comprising:
    organizing said packets in a plurality of flow control units called flits.

11. The method of claim 9, further comprising:
    reporting in the network the transaction status in order to indicate the presence of errors and the flow control units affected by said errors.

12. The method of claim 9, further comprising:
    using as said variable granularity arbitration process a round-robin arbitration process.

13. The method of claim 9, comprising transforming between said different protocols used by said IP cores based on mapping and translation operations.

14. A method of exchanging information transported in packets including a header and one or more payloads in a communication network comprising routers, wherein information is exchanged via the routers between a plurality of Intellectual Property (IP) cores using different protocols, said method comprising:
    transporting in a versatile packet format different traffic patterns generated by said IP cores using different protocols to ensure interoperability between said IP cores;
    managing crossing of the different traffic patterns by said routers in the communication network of said different traffic patterns using at each router a variable granularity arbitration process enabling different traffic patterns generated by different IP cores to be treated differently by the routers;
    providing a parametric structure of the header of the packet; and
    determining an arbitration granularity as a function of the start and the end of a transaction based on structure information of a header of the packet that has a parametric structure.

15. The method of claim 14, further comprising:
organizing said packets in a plurality of flow control units called flits.

16. The method of claim 14, further comprising:
reporting in the network the transaction status in order to indicate the presence of errors and the flow control units affected by said errors.

17. The method of claim 14, further comprising:
using as said variable granularity arbitration process a round-robin arbitration process.

18. The method of claim 14, comprising transforming between said different protocols used by said IP cores based on mapping and translation operations.

19. A method of exchanging information transported in packets including a header and one or more payloads in a communication network comprising routers, wherein information is exchanged via the routers between a plurality of Intellectual Property (IP) cores using different protocols, said method comprising:
transporting in a versatile packet format different traffic patterns generated by said IP cores using different protocols to ensure interoperability between said IP cores;
managing crossing of the different traffic patterns by said routers in the communication network of said different traffic patterns using at each router a variable granularity arbitration process enabling different traffic patterns generated by different IP cores to be treated differently by the routers; and
organizing said packets in a plurality of flow control units called flits.

20. The method of claim 19, further comprising:
providing a parametric structure of the header of the packet; and
entering in said structure information on the boundaries of the packets.

21. The method of claim 19, further comprising:
reporting in the network the transaction status in order to indicate the presence of errors and the flow control units affected by said errors.

22. The method of claim 19, further comprising:
using as said variable granularity arbitration process a round-robin arbitration process.

23. The method of claim 19, comprising a transforming between said different protocols used by said IP cores based on mapping and translation operations.

24. A method of exchanging information transported in packets including a header and one or more payloads in a communication network comprising routers, wherein information is exchanged via the routers between a plurality of Intellectual Property (IP) cores using different protocols, said method comprising:
transporting in a versatile packet format different traffic patterns generated by said IP cores using different protocols to ensure interoperability between said IP cores;
managing crossing of the different traffic patterns by said routers in the communication network of said different traffic patterns using at each router a variable granularity arbitration process enabling different traffic patterns generated by different IP cores to be treated differently by the routers; and
reporting in the network a transaction status in order to indicate a presence of errors and a flow control units affected by said errors.

25. The method of claim 24, further comprising:
providing a parametric structure of the header of the packet; and
entering in said structure information on the boundaries of the packets.

26. The method of claim 24, further comprising:
using as said variable granularity arbitration process a round-robin arbitration process.

27. The method of claim 24, comprising a transformation between said different protocols used by said IP cores based on mapping and translation operations.

28. A method of exchanging information transported in packets including a header and one or more payloads in a communication network comprising routers, wherein information is exchanged via the routers between a plurality of Intellectual Property (IP) cores using different protocols, said method comprising:
transporting in a versatile packet format different traffic patterns generated by said IP cores using different protocols to ensure interoperability between said IP cores;
managing crossing of the different traffic patterns by said routers in the communication network of said different traffic patterns using at each router a variable granularity arbitration process enabling different traffic patterns generated by different IP cores to be treated differently by the routers; and
using said variable granularity arbitration process as a round-robin arbitration process.

29. The method of claim 28, further comprising:
providing a parametric structure of the header of the packet; and
entering in said structure information on the boundaries of the packets.

30. The method of claim 28, comprising a transformation between said different protocols used by said IP cores based on mapping and translation operations.

\* \* \* \* \*